United States Patent
Ball et al.

(10) Patent No.: US 7,153,346 B2
(45) Date of Patent: Dec. 26, 2006

(54) PNEUMATIC FILTER AND METHOD OF MAKING

(75) Inventors: Larry K. Ball, Chandler, AZ (US); Antal Schmied, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 335 days.

(21) Appl. No.: 10/779,445

(22) Filed: Feb. 12, 2004

(65) Prior Publication Data
US 2006/0230940 A1   Oct. 19, 2006

(51) Int. Cl.
*B01D 45/04* (2006.01)
(52) U.S. Cl. ............... 96/413; 55/DIG. 14; 73/863.81
(58) Field of Classification Search ............... 96/413; 55/DIG. 14; 415/121.2, 169.2; 73/863.81
See application file for complete search history.

(56) References Cited

U.S. PATENT DOCUMENTS

| | | | |
|---|---|---|---|
| 3,000,213 A | * | 9/1961 | Eves et al. ............... 374/138 |
| 3,315,806 A | | 4/1967 | Sigwart et al. |
| 3,630,498 A | | 12/1971 | Bielinski et al. |
| 3,710,561 A | | 1/1973 | Garrone |
| 3,740,163 A | | 6/1973 | Schinnerer et al. |
| 3,815,336 A | | 6/1974 | Rigo |
| 4,244,708 A | | 1/1981 | Bielefeldt |
| 4,412,654 A | | 11/1983 | Yates et al. |
| 4,441,994 A | | 4/1984 | Beneke et al. |
| 4,886,523 A | | 12/1989 | Maldague |
| 5,016,823 A | | 5/1991 | Kato et al. |
| 5,131,807 A | | 7/1992 | Fischer et al. |
| 5,295,537 A | | 3/1994 | Trainer |
| 5,306,330 A | | 4/1994 | Nasikas |
| 5,553,669 A | | 9/1996 | Trainer |
| 5,653,880 A | | 8/1997 | Mouton |
| 6,312,594 B1 | | 11/2001 | Conrad et al. |
| 2003/0150198 A1 | | 8/2003 | Illingworth et al. |

FOREIGN PATENT DOCUMENTS

| | | |
|---|---|---|
| DE | 279 641 C | 10/1914 |
| GB | 897 417 A | 5/1962 |
| WO | PCT/US2005/004382 | 8/2005 |

\* cited by examiner

*Primary Examiner*—Robert A. Hopkins
(74) *Attorney, Agent, or Firm*—Ingrassia Fisher & Lorenz (57) ABSTRACT

A filter configured to be disposed within an air passage, for providing filtered air to a pneumatically controlled component. In one embodiment, the filter comprises a main body having first and second ends and a passageway extending therebetween, a leading edge, a trailing edge, and first and second sides. The first and second sides converge at least proximate the trailing edge and are separated from one another by a longitudinal slit that extends along a section thereof. The leading edge is configured to divide a main airflow containing particles into first and second airflow portions. The first airflow portion contains particles and is directed through the air passage and the second airflow portion is substantially particle-free and directed through the longitudinal slit into the main body passage.

32 Claims, 5 Drawing Sheets

PNEUMATIC FILTER AND METHOD OF MAKING

FIELD OF THE INVENTION

The present invention relates to a filter, and more particularly, a pneumatic filter having less frequency of clogging.

BACKGROUND OF THE INVENTION

Compressed gas such as air is often used for starting an aircraft gas turbine, or jet engine. Compressed air flows to the starter which causes rotation of the compressors and the turbines within the jet engine. When sufficient air flows through the jet engine (reflected by turbine speed or otherwise), the jet fuel can be ignited within the combustion area/combustor to start the engine. Without the compressor/turbine rotation provided by the starter, fuel combustion and air flow through the engine will not be sufficient to start the engine. The compressed air from the air turbine starter is controlled by a starter valve, such as an air regulating and shut-off butterfly valve, and the starter valve is, in turn, controlled by a control valve.

Typically, the control valve is coupled to a probe that is disposed within the same duct within which the starter valve resides. The probe is configured to divert a portion of air that flows through the duct toward the control valve so that the control valve may be pneumatically operated.

At times, the air that flows through the starter valve duct may contain various particles, dirt, or other contaminants. When the air is directed to various parts of the control valve, such as for example, the orifices, valve mechanism, or springs, particles in the air may buildup or collect on the components, thereby possibly decreasing operability and increasing frequency of maintenance. To prevent or minimize particle contamination, filters have been used downstream of the probe or mounted within the probe. The most common method for filtering has been the use of porous filters, such as those consisting of wire mesh or sintered powdered metal, embedded within the probe. However, porous filters have limited life due to pore clogging and thus necessitate frequent removal and replacement of the probe. Other types of filters have included down-stream facing filters. Although these types of filters do not need frequent replacement, they are not highly effective filters.

Accordingly, there exists a need for a filter with improved filtering capabilities. Preferably, the filter operates with or is an integral part of the probe. Additionally, it is desirable that the improved filter be low in cost to manufacture and does not need frequent replacement. Furthermore, other desirable features and characteristics of the present invention will become apparent from the subsequent detailed description of the invention and the appended claims, taken in conjunction with the accompanying drawings and this background of the invention.

SUMMARY OF THE INVENTION

The present invention provides a filter configured to be disposed within an air passage, for providing filtered air to a pneumatically controlled component. In one embodiment, the filter comprises a main body having first and second ends and a passageway extending therebetween, a leading edge, a trailing edge, and first and second sides. The first and second sides converge at least proximate the trailing edge and are separated from one another by a longitudinal slit that extends along a section thereof. The leading edge is configured to divide a main airflow containing particles into first and second airflow portions. The first airflow portion contains particles and is directed through the air passage and the second airflow portion is substantially particle-free and directed through the longitudinal slit into the main body passage.

In another embodiment, and by way of example only, an air turbine starter is provided. The air turbine starter has a duct, a valve, an actuator, a rate control servo and a filter. The valve is disposed within the duct, the actuator is coupled to the valve, and the rate control servo coupled to the actuator. Additionally, the filter is disposed within the duct and is in fluid communication with the rate control servo. The filter comprises a main body having first and second ends and a passageway extending therebetween, a leading edge, a trailing edge, and first and second sides, the first and second sides converging at least proximate the trailing edge and are separated from one another by a longitudinal slit that extends along a section thereof. The leading edge is configured to divide a main airflow containing particles into first and second airflow portions, where the first airflow portion containing particles and being directed through the air passage and the second airflow portion being substantially particle-free and directed through the longitudinal slit into the main body passage.

In yet another embodiment, a method for constructing the filter is provided. The method comprises shaping a tube to include a leading edge, a trailing edge, first and second ends and a passage that extends therebetween, cutting a longitudinal slit into the tube trailing edge, and sealing the tube first end.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of valve. Thus, although the present invention is, for convenience of explanation, depicted and described as being implemented in a butterfly valve shaft, it should be appreciated that it can be implemented in numerous other valve shafts, such as a fluid control valve, and various other machines in which filtered air is needed for pneumatic operation.

Figure 1:
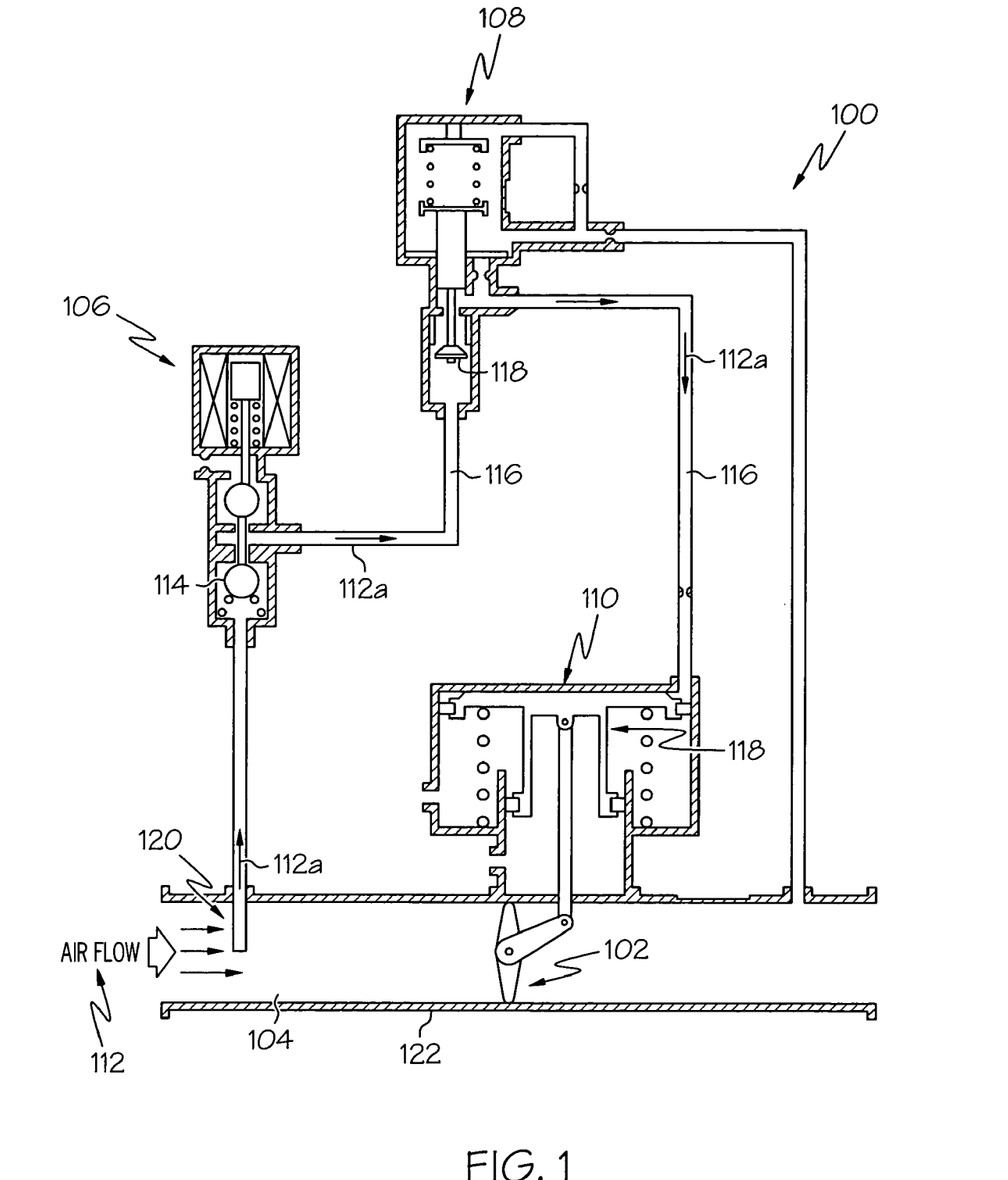
FIG. 1 is a schematic of an exemplary starter control valve.

Turning now to FIG. 1, an exemplary fluid control valve, or starter control valve 100 is shown. The starter control valve 100 is pneumatically operated and generally includes a butterfly valve 102, a solenoid control valve 106, rate control servo 108, and actuator 110. The butterfly valve 102 is disposed within a duct 104 and is configured to open and close the duct 104 to control the flow of the pressurized air 112 to the air turbine starter (not shown). The duct 104 may be in fluid communication with any one of various sources of pressurized or compressed air, such as, for instance, an auxiliary power unit, bleed air from the compressor stage of another operating gas turbine engine, or a gas turbine ground power cart.

A portion of the air 112a in the duct 104 is directed to the solenoid control valve 106 and rate control servo 108 to ultimately operate the actuator 110. To this end, the solenoid control valve 106 operates a valve mechanism 114 that is coupled thereto, such that when the solenoid control valve 106 is energized, it opens the valve mechanism 114, and when it is de-energized, the valve mechanism 114 is closed. The solenoid control valve 106 is further coupled to the rate control servo 108. Thus, when the solenoid control valve is energized, the air 112a is allowed to pass through the control valve air passages 116 to the rate control servo 108. The rate control servo 108 also has a valve mechanism 118 to control air flow, specifically, by regulating the rate at which the air flows through the air passages 116 and to the pneumatically-operated actuator 110.

The airflow 112a serves as the pressure source for the operation of the actuator 110. The actuator 110 preferably includes a piston 118 that is in communication with the airflow 112a and responds to the pressure to thereby supply torque upon the butterfly valve 102 in a desired direction and at a controlled rate.

Figure 2:
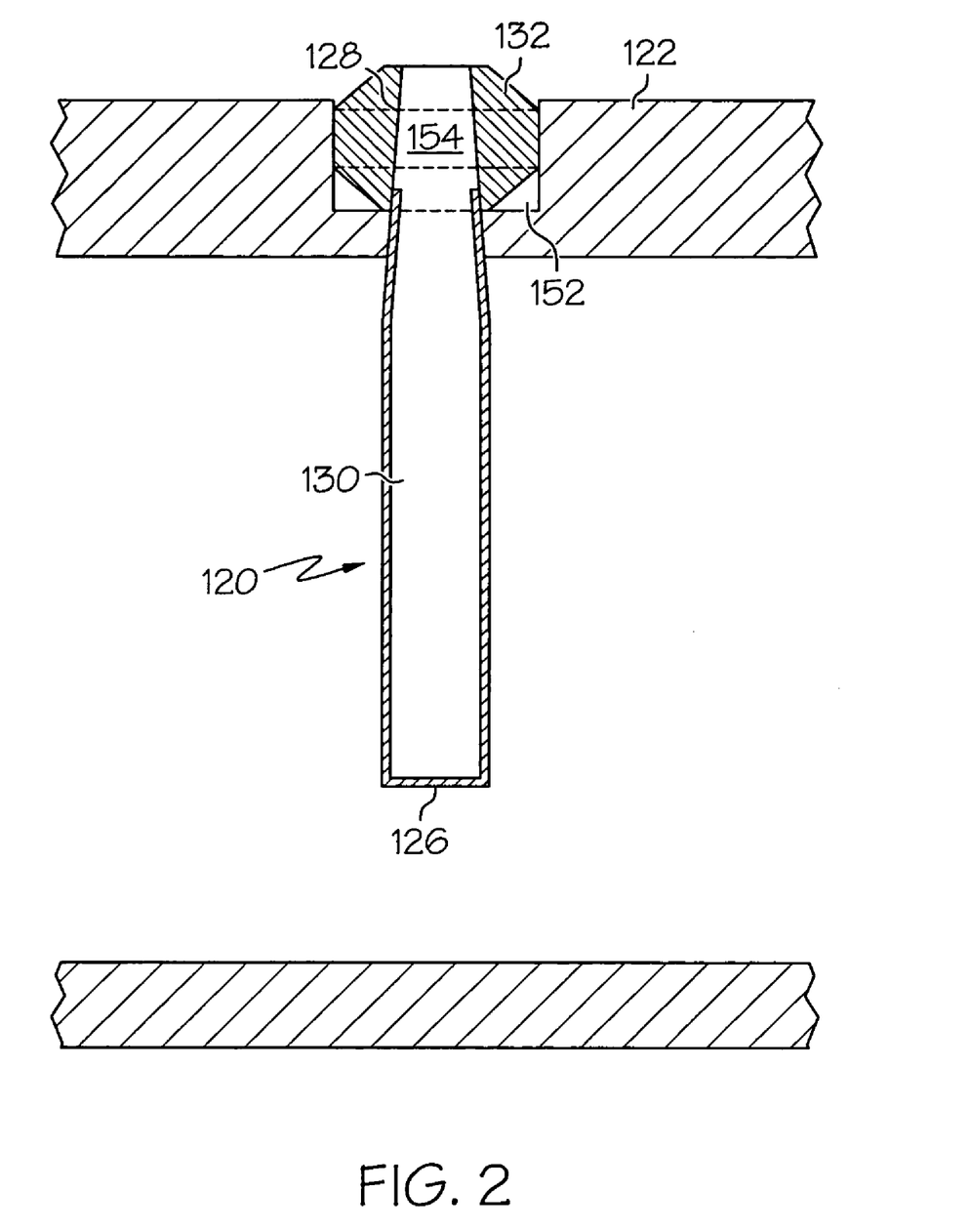
FIG. 2 is a close up view of the portion of the starter control valve within which an exemplary filter is disposed in FIG. 2.

The portion of airflow 112a is directed out of the duct 104 via a probe 120, which also serves as a filter. With reference to FIGS. 1 and 2, the filter or probe 120 at least partially extends into the duct 104 and is preferably mounted to the sidewall 122 thereof.

Figure 3:
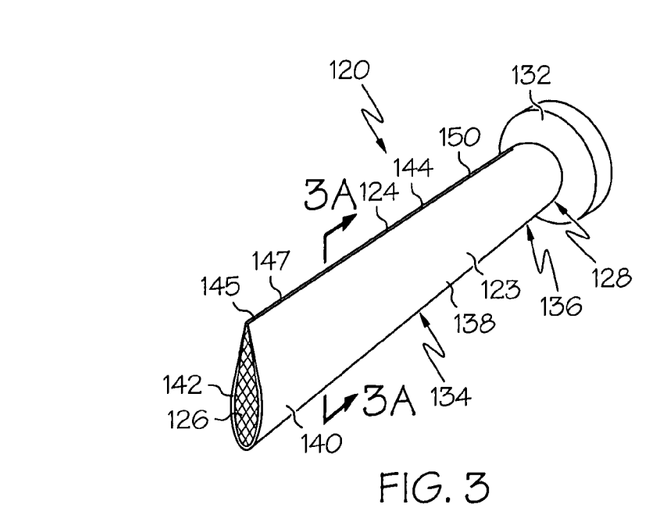
FIG. 3 is perspective view of the exemplary filter that can be used in the starter control valve of FIG. 1.

Referring to FIGS. 2 and 3, the probe 120 includes a main body 123 that has first and second ends 126, 128 and a passage 130 extending between the first and second ends 126, 128. The probe first end 126 is preferably plugged, or otherwise sealed to prevent air or fluid from entering the first end 126. A sleeve 132 is coupled to the probe second end 128. Each of these parts will now be discussed.

Figure 3A:
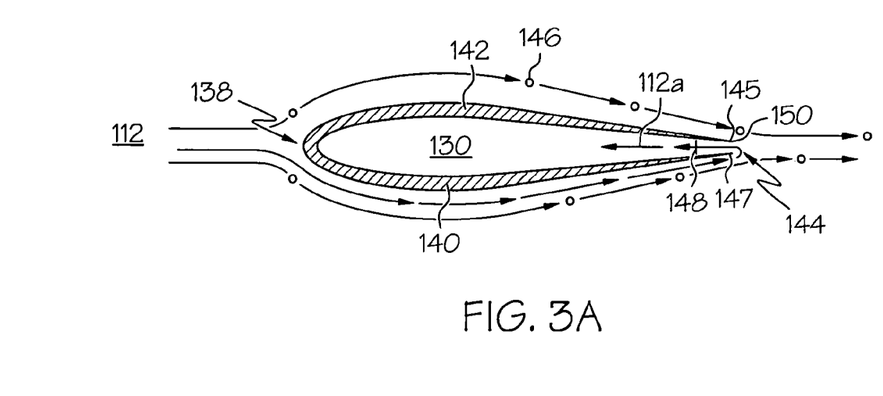
FIG. 3A is a cross section view of the portion of exemplary filter of FIG. 4 along the lines 3A—3A showing airflow path.
Figure 3B:
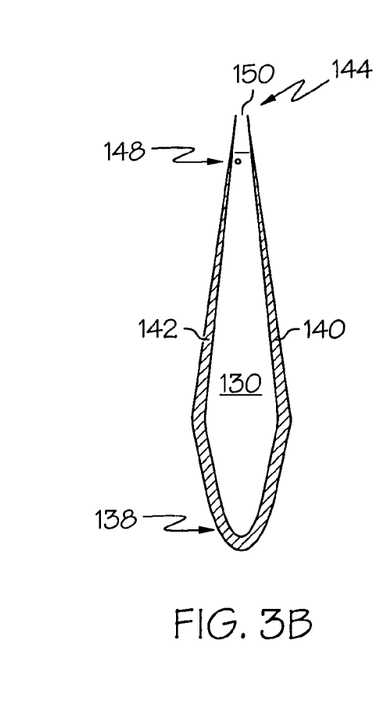
FIG. 3B is a cross section view similar to the view of FIG. 3A of a portion of another exemplary filter.

The probe main body 123 includes at least two sections, a wing-shaped section 134 and a cylindrical section 136. The wing-shaped section 134 has a leading edge 138 and two sides 140, 142 that converge toward one another, at an angle 148, to form a trailing edge 144. The leading edge 138 is configured to cause particles 146 that may be present in the main airflow 112 to follow a path along the sides 140, 142 of the main body 123 and to continue along the same trajectory once the particles leave the sides 140, 142, as shown in FIG. 4A. Once a particle 146 travels the path along one of the sides 140, 142, it builds up sufficient inertia to continue past the trailing edge 144. Thus, it is most preferable that the leading edge 138 is curved and smooth, however, as will be appreciated, the leading edge 138 can also be beveled (shown in FIG. 3B), so long as the included bevel angle is between approximately 10 and 20 degrees and most preferably about 13 degrees.

As was noted above, an angle 148 is formed between the two sides 140, 142 of the main body 123. This angle 148, among other things, aids in keeping the particles 146 moving along a particular trajectory. Preferably, the angle 148 that exists between the two sides 140, 142 is relatively small. In the preferred embodiment, the angle 148 between the two sides 140, 142 is between approximately 10 and 20 degrees, and most preferably about 13 degrees.

The two sides 140, 142 are also spaced apart from one another by a longitudinal slit or small gap 150. The gap 150 is configured to be small enough so that the momentum of the particles 146 traveling along the sides 140, 142 causes them to continue along a particular trajectory so that they cannot round the corners of the sides 140, 142 to enter the tube passage 130. To this end, the gap 150 is preferably between about 0.005–0.010 inches. The gap 150 preferably extends along the majority of the trailing edge 144 of the wing-shaped section 134. However, as will be appreciated by those skilled in the art, the gap 150 may extend for any length along the trailing edge 144 such that a sufficient amount of particle-free air from the airflow 112 can enter into the passage 130.

A cross-section of the wing-shaped section 134 of the probe main body 123 depicted in FIG. 3, taken along line 3A—3A is provided in FIG. 3A. The tip portions 145, 147 of each of the sides 140, 142 are configured so as to provide a tight bend around which a portion of the air from the airflow 106 travels. Thus, the tip portions 145, 147 are preferably razor-sharp to help in diverting substantially particle-free air into the probe passage 130. Moreover, the edges of the two sides 140, 142 are preferably tapered.

As previously mentioned, the end of the probe first end 126 is preferably plugged so that minimal amounts of air can leak out of the first end 126. To this end, the probe first end 126 may be plugged with an epoxy resin, bent, brazed, or otherwise closed. The second end 128 of the probe 120 has a sleeve 132 that is coupled thereto. As can be more clearly seen in FIG. 2, the sleeve 132 is configured to tightly fit into a recess 152 of the duct sidewall 122 so as to prevent fluid leakage from the duct 104 into the recess 152. Thus, the sleeve 132 can be an appropriately shaped nut or any other type of mounting surface. The sleeve 132 also has a flow passage 154 that extends therethrough to allow the air 112a to fluidly communicate between the probe passage 130 and the air passage 116 of the control valve 100.

In the depicted embodiment, the probe second end 128 is located on the cylindrical section 136, however, as may be appreciated, the cylindrical section 136 can be omitted altogether. In such case, the wing-shaped section 134 could extend the entire length of the probe 120, thus, the probe second end 128 would be located on the winged-section 134, and the sleeve 132 and associated flow passage 154 (shown in FIG. 2) would be appropriately shaped for coupling thereto.

The probe 120 can be constructed of any one of numerous types of materials that is sufficiently stiff, corrosion-resistant, and provide for cost-effective manufacture. Moreover, sleeve 132 can be constructed of a different material than the rest of the probe 120. Most preferably, the probe 120 is constructed of stainless steel. Although the probe 120 can be constructed in any numerous ways, a preferred method of constructing the probe 120 will now be discussed Turning to the flowchart provided in FIG. 4, each step of the method to be discussed is referenced hereafter in parentheses. The first step of the preferred method for constructing the probe 120 is to obtain an appropriately dimensioned tube (400). The size and diameter of the tube depends on the relative size of the duct in which the resulting probe will be disposed. In a preferred embodiment, the original tube is cylindrically-shaped. In another embodiment, the original tube is square-shaped. Once the tube is obtained, it is cut into a desired length.

Figure 4:
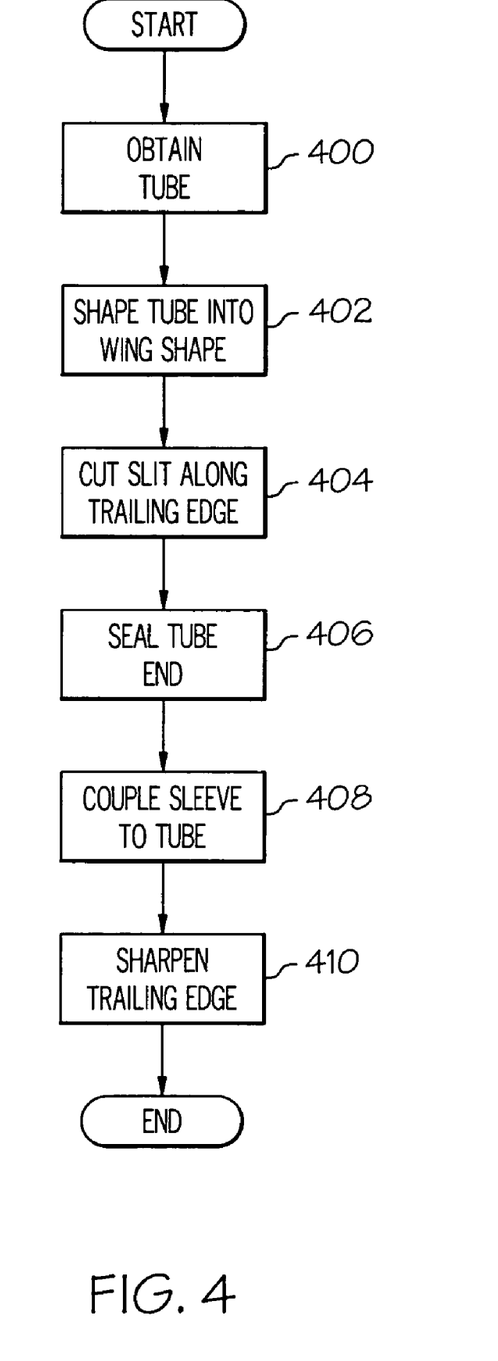
FIG. 4 is a flowchart of an exemplary method for the construction of the exemplary filter.

Next, a portion of the tube is shaped into a wing (402), while another portion maintains its original shape. Alternatively, the entire length of the tube is shaped into a wing. To this end, a wing-shaped mold, preferably having an angle of between 10–20 degrees, is inserted into the tube and the tube is crimped until it takes roughly the same shape as the mold. Next a slit is cut along the trailing edge of the wing-shaped tube resulting in a gap (404). Preferably, the tube is placed into a holder and a wire electro-discharge machine is used to make the cut so that the desired portion to be cut is essentially eroded or corroded away and into the preferred shape. The gap is preferably between about 0.005–0.010 inches in width. Optionally, after the cut is made, the wing-shape of the tube is refined. In such case, preferably, the tube is placed into a two-piece fixture, wherein each piece has one half of a cast of the wing-shaped mold used above. The fixture is then pressed together so that the tube takes the shape of the cast.

Then, one end of the tube is sealed (406). The end to be sealed is preferably plugged with epoxy resin or any other type of plugging material. Alternatively, the end to be sealed can be folded over, or a brazing alloy can be used to braze the end closed. At another end of the tube, a sleeve or any other type of mounting surface that is appropriately configured to fit into the recess in the valve sidewall and mounted on to the tube end is coupled thereto (408). Preferably, the sleeve is fit on to the tube end and then a brazing alloy is used to fix the two together. Optionally, the tip of the trailing edge of the wing-shaped tube is honed so that the trailing edge is razor-sharp (410). Once the probe 120 is constructed, it is ready to be mounted to the duct sidewall and positioned so that when air flows through the duct, it first contacts the probe leading edge.

Figure 5:
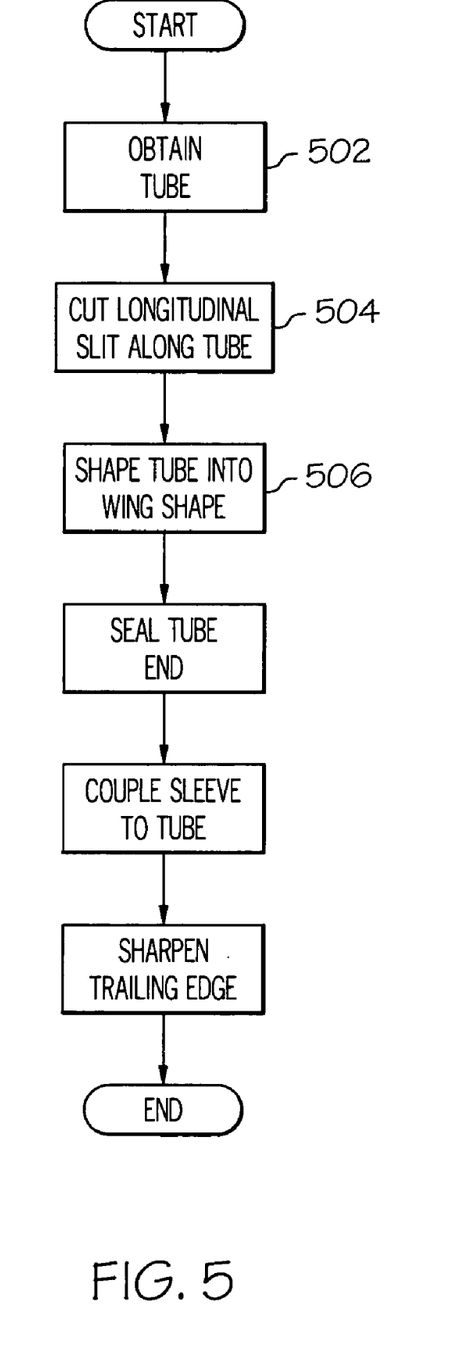
FIG. 5 is a flowchart of another exemplary method for the construction of the exemplary filter.

In an alternative method, shown in FIG. 5, after the tube is obtained (502), a longitudinal cut is made along at least a portion of the length of the tube (504). The tube can be placed into a holder and a wire electro-discharge machine can be used to make the cut so that the desired portion to be cut is essentially eroded or corroded away and into the preferred shape. The gap is preferably between about 0.005–0.010 inches in width. Then, after the cut is made, a portion of the tube is shaped into a wing (506) such that the longitudinal cut is on the trailing edge of the wing-shape, while another portion maintains its original shape, or alternatively, the entire length of the tube is shaped into a wing. The remaining steps of this alternative method are similar to the method described in FIG. 4.

Thus, a filter having the capability of serving as a probe has been provided. The filter meets the above-mentioned needs and is cost efficient to manufacture and easy to maintain. Moreover, the filter does not need frequent replacement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A filter configured to be disposed within an air passage, for providing filtered air to a pneumatically controlled component, comprising:
   a main body having first and second ends and a passageway extending therebetween, a leading edge, a trailing edge, and first and second sides, the first and second sides converging at least proximate the trailing edge and separated from one another by a longitudinal slit that extends along a section thereof; and
   a sleeve coupled to the main body first end,
   wherein the leading edge is configured to divide a main airflow containing particles into first and second airflow portions, the first airflow portion containing particles and being directed through the air passage and the second airflow portion being substantially particle-free and directed through the longitudinal slit into the main body passage.

2. The filter of claim 1, wherein the main body second end includes a seal.

3. The filter of claim 2, wherein the seal is an epoxy resin.

4. The filter of claim 2, wherein the seal is a bring alloy brazed to the second end.

5. The filter of claim 1, wherein the leading edge has a curved shape.

6. The filter of claim 1, wherein the leading edge has a beveled shape.

7. The filter of claim 1, wherein the longitudinal slit extends the length of the main body.

8. The filter of claim 1, wherein the longitudinal slit has sharp edges.

9. The filter of claim 1, wherein the width of the longitudinal slit is between about 0.005–0.010 inches.

10. The filter of claim 1, wherein first and second sides have an angle between them of between about 10–20 degrees.

11. The filter of claim 1, wherein the first and second sides have an angle between them of about 13 degrees.

12. The filter of claim 1, wherein the main body has a wing-shaped cross section.

13. A fluid control valve comprising:
    a duct;
    a valve disposed within the duct;
    an actuator coupled to the valve;
    a servo coupled to the actuator; and
    a filter disposed within the duct and in fluid communication with the servo, the filter comprising:
       a main body having first and second ends and a passageway extending therebetween, a leading edge, a trailing edge, and first and second sides, the first and second sides converging at least proximate the trailing edge and separated from one another by a longitudinal slit that extends along a section thereof,
       wherein the leading edge is configured to divide a main airflow containing particles into first and second airflow portions, the first airflow portion containing particles and being directed through the air passage and the second airflow portion being substantially particle-free and directed trough the longitudinal slit into the main body passage.

14. The filter of claim 13, wherein the longitudinal slit has sharp edges.

15. The filter of claim 13, wherein the width of the longitudinal slit is between about 0.005–0.010 inches.

16. The filter of claim 13, wherein the first and second sides have an angle between them of between about 10–20 degrees.

17. A method of constructing a filter, the method comprising:
shaping a tube to include a leading edge, a trailing edge, first and second ends and a passageway that extends therebetween;
cutting a longitudinal slit into the tube trailing edge;
sealing the tube first end; and
coupling a sleeve to the tube second end.

18. The method of claim 17, wherein shaping the tube further includes shaping the tube into a wing-shape.

19. The method of claim 17, further comprising:
sharpening the longitudinal lit of the tube trailing edge.

20. The met of claim 17, wherein the step of shaping the tube further comprises inserting a mold having a wing shape into the tube and crimping the tube around the mold.

21. A filter configured to be disposed within an air passage, for providing filtered air to a pneumatically controlled component, comprising:
a main body having first and second ends and a passageway extending therebetween, at least a portion of the main body being wing-shaped, the wing-shaped portion including a leading edge and a trailing edge, the trailing edge having a longitudinal slit therethrough that extends along a section thereof; and
a sleeve coupled to the main body first end,
wherein the wing-shaped portion is configured to divide a main airflow containing particles into first and second airflow portions, the first airflow portion containing particles and being directed through the air passage and the second airflow portion being substantially particle-free and directed trough the longitudinal slit into the tube passage.

22. The filter of claim 21, wherein the main body second end includes a seal.

23. The filter of claim 22, wherein the seal is an epoxy resin.

24. The filter of claim 22, wherein the seal is a brazing alloy brazed to the second end.

25. The filter of claim 21, wherein the leading edge has a curved shape.

26. The filter of clam 21, wherein the leading edge has a beveled shape.

27. The filter of claim 21, wherein the longitudinal slit extends the length of the wing-shaped portion.

28. The filter of claim 21, wherein the longitudinal slit has sharp edges.

29. The filter of claim 21, wherein the width of the longitudinal slit is between about 0.005–0.010 inches.

30. The filter of claim 21, wherein first and second sides have an angle between them of between about 10–20 degrees.

31. The filter of claim 21, wherein the first and second sides have an angle between them of about 13 degrees.

32. A filter configured to be disposed within an air passage, for providing filtered air to a pneumatically controlled component, comprising:
a main body having first and second ends and a passageway extending therebetween, a leading edge, a trailing edge, and first and second sides, the first and second sides each being substantially solid and having first and second ends, the first and second side first ends joined together at the leading edge, and the first and second side second ends converging at least proximate the trailing edge, and separated from one another by a longitudinal slit that extends along a section thereof,
wherein the leading edge is configured to divide a main airflow containing particles into first and second airflow portions, the first airflow portion containing particles and being directed through the air passage and the second airflow portion being substantially particle-free and directed through the longitudinal slit into the main body passage.

* * * * *

UNITED STATES PATENT AND TRADEMARK OFFICE
CERTIFICATE OF CORRECTION

PATENT NO. : 7,153,346 B2  
APPLICATION NO. : 10/779445  
DATED : December 26, 2006  
INVENTOR(S) : Larry K. Ball et al.

It is certified that error appears in the above-identified patent and that said Letters Patent is hereby corrected as shown below:

Column 6, line 25, "bring" should be changed to --brazing--;  
Column 6, line 62, "trough" should be changed to --through--;  
Column 7, line 34, "trough" should be changed to --through--.

Signed and Sealed this

Fifteenth Day of May, 2007

JON W. DUDAS  
*Director of the United States Patent and Trademark Office*